UNITED STATES PATENT OFFICE.

ABRAHAM BARTHOLF, OF NEW YORK, N. Y.

UTILIZING RHUBARB CHIPS.

SPECIFICATION forming part of Letters Patent No. 443,249, dated December 23, 1890.

Application filed July 12, 1890. Serial No. 358,547. (No specimens.)

*To all whom it may concern:*

Be it known that I, ABRAHAM BARTHOLF, a citizen of the United States, and a resident of the city, county, and State of New York, have invented a new and useful Improvement in the Treatment of Rhubarb-Root, of which the following is a specification.

Rhubarb-root of commerce is usually prepared for use by cutting or sawing out the sound portions of the root into fingers, squares, oblongs, circles, &c., in solid form. By thus cutting away the decayed or worm-eaten portions of the root the value and cost of the sound portions are greatly augmented, while the chips, dust, &c., are of little value, compared with the original root or the perfect product, as such chips and dust can only be utilized in the form of powder.

The object of my invention is to treat the sound chips which have been removed from the original root in such a manner as to produce an article of rhubarb equal in value, quality, and usefulness to the sound product cut from the whole root.

To carry my invention into effect the chips are ground or granulated, then slightly dampened, adhesive material—such as gum-arabic—added thereto, and the mass thoroughly mixed in any suitable receptacle. The mass is then spread or rolled out while in a plastic state, and when dry is cut or sawed into fingers or other shapes of uniform pieces for convenience in use. If desired, the mass while in a plastic state may be pressed or molded into the desired forms. When thus treated, my rhubarb-root so closely resembles the solid root when cut into shapes as to be hardly distinguishable therefrom. My method of treatment does not injure the product in any manner or impair its medicinal qualities, while at the same time the product will keep in any climate, and is not subjected to the ravages of insects, &c.

Having now fully described my invention, what I claim as new therein, and desire to secure by Letters Patent, is—

The improvement in the art of treating rhubarb chips, which consists in dampening or moistening the chips or granules thereof, mixing adhesive material therewith, spreading or rolling out the mass in a plastic condition, drying, and cutting or sawing into shapes, substantially as set forth.

ABRAHAM BARTHOLF.

Witnesses:
A. M. PIERCE,
GERTRUDE WARD.